Dec. 11, 1923.

N. W. STORER
ELECTRICAL SYSTEM
Filed July 5, 1919

1,477,465

2 Sheets-Sheet 1

WITNESSES:
H. J. Shelhamer
W. R. Coley

INVENTOR
Norman W. Storer
BY
Wesley G. Carr
ATTORNEY

Dec. 11, 1923.
N. W. STORER
ELECTRICAL SYSTEM
Filed July 5, 1919
1,477,465
2 Sheets-Sheet 2
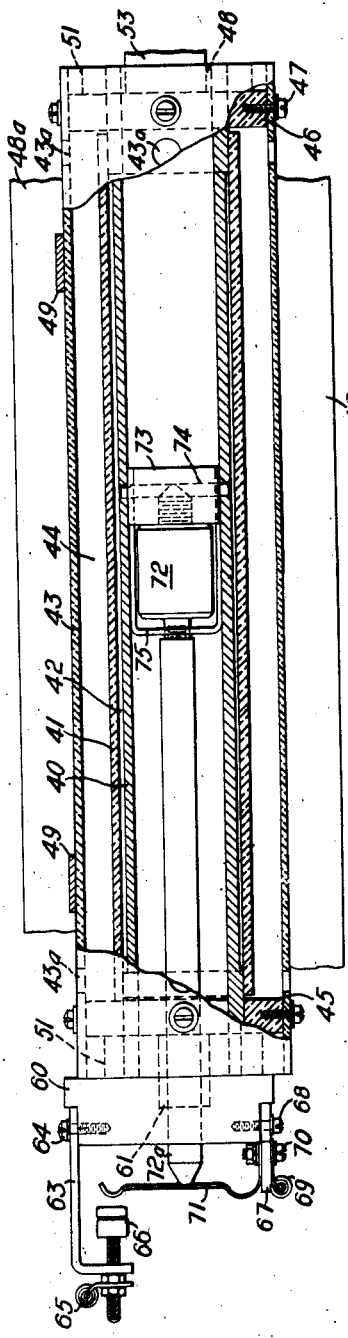
WITNESSES:
INVENTOR
Norman W. Storer
BY
ATTORNEY Patented Dec. 11, 1923.

1,477,465

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed July 5, 1919. Serial No. 308,742.

*To all whom it may concern:*

Be it known that I, NORMAN W. STORER, a citizen of the United States, and a resident of Pittsburgh, in the county of Allegheny and State of Pennsylvania, have invented a new and useful Improvement in Electrical Systems, of which the following is a specification.

My invention relates to electrical systems and particularly to thermostatic devices and the location thereof with respect to translating devices the temperature of which it is desired to regulate.

One object of my invention is to provide a relatively simple and inexpensive thermostatic device which is adapted to inherently possess the same cooling characteristics as a given translating device, such as a car-propelling motor, the thermostatic device being further adapted to be readily mounted in any convenient position in the locomotive cab, so that the operator may have a continuous visual indication of the temperature of the motors or other devices upon the locomotive.

More specifically stated, it is an object of my invention to provide a thermostatic device comprising a hollow metallic member made of cast iron or other material having relatively low electrical conductivity, the device being connected in circuit with the car-propelling motor, for example, and being so proportioned as to duplicate the temperature rise and fall of the motor under operating conditions.

Another object of my invention is to provide means whereby the thermostatic device in question may be adapted to possess the same thermal characteristics as the motor under conditions of forced ventilation, as well as natural ventilation.

A further object of my invention is to provide temperature-responsive means inserted in the hollow thermostatic device for automatically governing the operation of an electric motor driving the blower for the ventilating system, whereby the propelling-motor temperature may be maintained below a predetermined undesirable value.

Still another object of my invention is to provide a thermostatic device for the stated purpose, comprising a hollow bar or tube of cast iron, or the like, and a covering means comprising perforated insulating material or other wrapping means having relatively poor heat-conducting characteristics.

Figure 1:
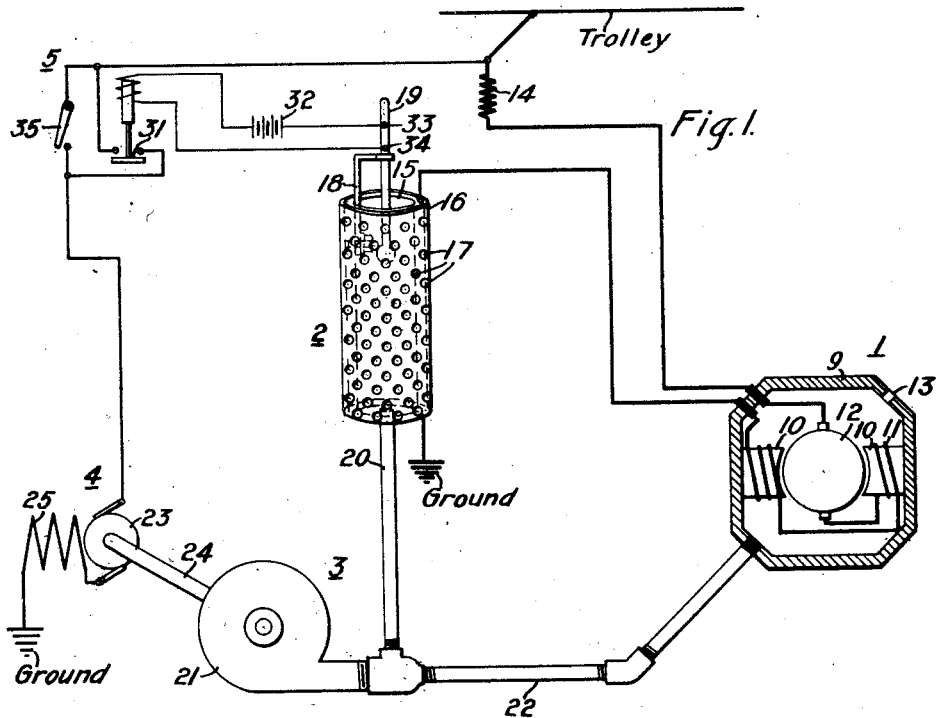
Figure 2:
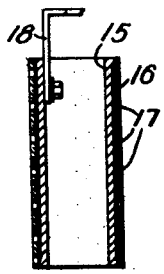

Other specific objects of my invention will become evident from the following detailed description taken in conjunction with the accompanying drawing, wherein Figure 1 is a diagrammatic view of a complete electrical system embodying my present invention;

Fig. 2 is a view, in longitudinal section, of one form of my thermostatic device; and Fig. 3 to Fig. 9 inclusive, are detail views of the preferred form of my invention.

Referring to Fig. 1, the system here shown comprises supply-circuit conductors trolley and ground; a car-propelling motor 1; my novel thermostatic device 2; a blower 3 for furnishing a cooling fluid to both the motor and the thermostatic device, whenever desired; an electric motor 4 for driving the blower 3; and switching means 5 for governing the blower motor 4 and, in turn, controlled by the action of the thermostatic device 2.

The car-propelling motor 1 is diagrammatically shown as comprising essentially a suitable frame or encasing member 9 having a plurality of inwardly-extending polar projections 10, around which suitable coils 11 are wound and are connected in series relation with an armature 12. One or more ventilating outlets 13 are provided in the frame, in accordance with customary practice.

The motor is connected, through the thermostatic device 2 and a suitable accelerating resistor 14, across the supply circuit, the device 2 being preferably connected on the "ground" side of the motor.

The thermostatic device 2 is shown upon a disproportionately large scale, for the sake of clearness, and comprises a hollow bar or tube 15 of cast iron or other material having relatively low electrical conductivity, around which a wrapper or cover 16 is placed. The wrapper 16 may be of any suitable insulating material or other means having relatively poor heat-conducting characteristics, and is provided with a plurality of apertures or perforations 17. Preferably, a small airspace is left between the wrapper and the tube, as shown in Fig. 2, for further heat-insulating purposes.

The metallic member 15 is shown as connected in direct series relation with the motor 1, although, if desired, any other circuit connection, whereby a current proportional to that traversing the motor also flows through the member 15, may be utilized.

The cross-section of the metallic member 15 is proportionate to the current rating of the motor or other translating device with which it is associated, whereby the thermal characteristics of the motor and the thermostatic device are the same; that is to say, the entire thermostatic device is so designed that the rate of heating and cooling thereof is equal to that of the car-propelling motor when no current is traversing the circuit. It will be appreciated that the necessary resistance and thermal capacity of the thermostatic device 2 may be readily calculated to suit any given operating conditions. The function of the perforated wrapper 16 is to assist such action of the iron tube and thus to provide rates of heat dissipation and absorption that correspond to those of the motor 1.

A bracket or holder 18 is bolted, or otherwise suitably secured to the inner surface of the metallic member 15, for the purpose of holding a thermometer 19 or other temperature-indicating or responsive means. The thermometer 19 may be employed not only to provide a continuous visual indication of the temperature of the car-propelling motor or motors but may also be utilized to control an electric circuit for governing the operation of the blower motor 4, as subsequently described in detail. A pipe 20 serves to effect communication between the blower apparatus 3 and the lower end of the thermostatic device.

The blower 3 may be of any suitable type and is shown as comprising a centrifugal blower apparatus 21 having a piping connection 22 to the motor 1 and also adapted to deliver a cooling medium through the pipe 20 to the thermostatic device 2.

It will be understood that the relative dimensions of the piping connections 20 and 22 are such that the rate of heat dissipation by the thermostatic device 2 under conditions of forced ventilation will be the same as that of the car-propelling motor 1.

Consequently, my thermostatic device may be employed, without the blower apparatus 3, to provide an indication of the temperature of the car-propelling motor or translating device, under conditions of natural ventilation, and may also be utilized, when forced ventilation is employed for the car-propelling motor, to likewise provide a dependable indication of the temperature conditions in the motor.

The driving motor 4 for the blower 3 is preferably of the series type, comprising a commutator-type armature 23 that is mechanically connected to the blower, as by a shaft 24, and a series-connected field winding 25.

The switching means 5 comprises an electrically-controlled switch 31 that is connected in series relation with the blower motor 4. The actuating coil of the switch is energized from a battery 32 upon the bridging of contact points 33 and 34 of the thermometer or other temperature-responsive means 19 by the mercury column thereof. Consequently, upon a predetermined rise of temperature in the car-propelling motor 1, which rise is duplicated in the locomotive cab by the thermostatic device 2, the contact points 33 and 34 are bridged to close the circuit of the actuating coil for the switch 31. In this way, the switch 31 is closed to set the blower motor 4 into operation, whereby a suitable volume of ventilating medium is delivered to both the car-propelling motor 1 and the thermostatic device. The temperature conditions in both the motor and the thermostatic device are thus automatically reduced to normal. Moreover, the blower motor, in the interests of economy, is not employed so long as the main-motor temperature is safe.

By the provision of a hand-switch 35, or the like, in a branch circuit of the blower motor 4, either natural or forced ventilation may be provided, at will, in the illustrated system and, in either case, the thermostatic device 2 will duplicate the temperature rise and fall in the car-propelling motor 1, as previously explained.

Referring to the preferred form of the invention that is shown in Fig. 3 to Fig. 9, inclusive, the illustrated structure comprises a hollow cast-iron rod or tubular member 40 around which a cover 41 of insulating material is wrapped, the cast-iron tube being of a greater diameter at the ends to provide a shallow annular air-space 42 between the metallic tube and the insulating wrapper. The purpose of this air-space is to prevent too rapid radiation of heat from the cast-iron tube, and the illustrated structure is thus one convenient way of proportioning the metallic member to possess thermal characteristics like those of the electric motor or other translating device to be governed.

An outer tube or wrapper 43 of insulating material provides a considerable annular space 44, the insulating tubes 41 and 43 being suitably spaced by means of insulating rings 45 and 46 near the respective ends of the tubes. The insulating rings 46 are secured to the outer tube 43 by means of suitable screws 47 and are positioned approximately at the ends of the inner insulating tube 41 to provide a compact and rigid structure.

The outer tube 43 is preferably provided with a small number of perforations or openings 43a for heat-radiating purposes, as previously mentioned in connection with Fig. 1.

The illustrated right-hand end of the cast-iron tube 40 may be closed, if desired, by means of a suitable insulating plug 48 to prevent the entrance of foreign material into the tube. To provide a suitable mounting for the thermostatic device, a wooden base 48a is provided, and a plurality of strap or stirrup members 49 surround the outer insulating tube 43, the ends of these straps being flanged and secured to the base 48a by means of screws 50. In this way, a compact and rigid structure is provided which may be readily mounted in any position and in any suitable place in the locomotive cab.

For the purpose of connecting the cast-iron tube 40 in circuit with the motor or other translating device to be governed, a plurality of terminal clamps 51 encircle the ends of the metallic tube, suitable contact pressure being applied by means of a clamping bolt 52, which forces the confronting ends of the ring together. The clamping ring may further be positioned by means of suitable screws 52a extending through the ring into the cast-iron tube 40.

For the sake of clearness, the complete main-circuit terminal that it shown in detail in Fig. 6 is, for the most part, omitted from Fig. 1. In addition to the clamping ring 51, the terminal comprises a longitudinally-extending strap 53 that is silver-soldered to a flat surface of the ring. A suitable wire-receiving terminal or socket 54 is clamped by bolts and washers 55, or the like, to the outer ends of the strap 53. The purpose of the illustrated terminal construction is to reduce the heat-radiation losses from the terminals proper and confine them to the cast-iron tube itself. Since the strap 53 is of such dimensions as to insure relatively low heat conductivity and radiation, it follows that the heat losses from the main-circuit terminals will be negligible, relatively speaking.

In addition to the main-circuit terminal, the illustrated left-hand end of the thermostatic device is provided with auxiliary-circuit contact members for the purpose of controlling the blower motor that is shown in Fig. 1. The structure in question comprises a block 60 of ebonized asbestos lumber, or the like, that has a central opening adapted to tightly fit over a bushing 61, while a suitable hub is fitted within the tube 40, whereby the block 60 may be properly positioned. A contact support or bent strap 63 is secured to one edge of the block 60 by means of a plurality of suitable screws 64, and a wire-receiving terminal 65, together with a threaded contact terminal 66, are suitably bolted to the support 63.

A second contact support or strap 67 is secured, by means of a plurality of screws 68, to the opposite edge of the block 60, and a wire-receiving terminal 69, similar to the terminal 65, is secured to the support 67 through the agency of a bolt 70. A resilient contact clip or spring 71, made of phosphor bronze, or the like, is also held in position by the bolt 70, and the free end of the clip 71 is positioned in alinement with the stationary contact terminal 66. The contact members 66 and 71 are thus adapted to close the circuit of the blower-controlling switch 31. (Fig. 1), similarly to the contact points 33 and 34 of the thermometer 19.

In the present instance, the temperature-responsive means that is located within the cast-iron tube 40, comprises a thermostatic element 72, of the type having an expansible sheath or cover, although it will be understood that my invention is not restricted to the use of this particular apparatus. One end of the thermostatic member 72 is mechanically secured to a slidable rod 72a of insulating material that extends through the cast-iron tube 40 and the bushing 61 to normally engage the contact clip 71, as illustrated; that is to say, whenever temperature conditions in my thermostatic device are relatively low. The other end of the thermostatic element 72 is supported in a recessed block or disk 73 through which a pin 74 extends for the purpose of rigidly positioning the disk 73 with respect to the cast-iron tube 40.

A stirrup or yoke 75, shown in detail in Figs. 7 and 8, has a central opening 76 that fits over the illustrated left-hand end, of reduced diameter, of the thermostatic element 72, the arms of the yoke 75 being rigidly positioned by means of the pin 74. The purpose of the yoke 75 is to limit the longitudinal expansion of the thermostatic element 72, whereby the contact clip 71 may be forced into engagement with the stationary contact terminal 66, but further contact pressure, and expansion of the thermostatic device are prevented.

The detail construction of the thermostatic device 72 is shown in Fig. 9 as comprising two metallic terminal members or caps 80 and 81, having hubs of reduced diameter for suitable association with the rod 72a and the supporting disk 73, as illustrated in Fig. 3. The device further comprises a body portion that includes an inner tubular member 82 for containing a suitable liquid 83, and a plurality of corrugations or spun disks 84 of copper, or the like. As the liquid 83 becomes heated, volatilizing at a definite temperature, the corrugations of the thermostatic device expand longitudinally and, therefore, force the cap 80 and the insulating rod 72a outwardly to effect engagement between the contact clip 71 and the stationary contact terminal 66. In this way, the switch 31 of Fig. 1 may be closed to start the blower motor into operation.

The pneumatic connection between the blower and the thermostatic device illustrated in Fig. 3 may be made in any convenient manner, preferably by tapping the pneumatic connection into the outer insulating tube 43 near the illustrated right-hand end thereof, whereby ventilating air is blown through the annular space 44 into the atmosphere from the illustrated left-hand end of the device.

It will be understood that the general design and proportions of the preferred form of my invention illustrated in Fig. 3 to Fig. 9, inclusive, follow the principles set forth in connection with the first-described modification of my invention, and, consequently, no further exposition of such principles is deemed necessary here.

It will be seen that I have thus provided a relatively simple thermostatic device wherein the necessary thermal capacity and electrical resistance are combined in one member, and the rate of heat radiation inherently duplicates that of the car-propelling motor, or other translating device with which it is associated, under conditions of either natural or forced ventilation. Furthermore, the thermostatic device may be of relatively small dimensions and may be connected in the motor circuit in any convenient location in the locomotive cab or street car.

I do not wish to be restricted to the specific structural details, circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a translating device, of a hollow metallic member having thermal characteristics like said device and connected in circuit therewith, and means for forcing a cooling medium through said hollow member.

2. The combination with a translating device, of a hollow cast iron member having a section proportionate to the current rating of said device, and connected in series relation therewith, and means for sending a ventilating fluid through said member.

3. The combination with a translating device, of a metallic member of relatively low electrical conductivity connected in circuit with said device and having a section proportionate to the current rating of said device, and means for simultaneously delivering a ventilating fluid to said device and to said member.

4. The combination with an electric motor, of a hollow metallic member of relatively low electrical conductivity connected in circuit with said motor and adapted to inherently possess the same cooling characteristics as the motor, and single means for sending a cooling medium through said motor and said member.

5. The combination with an electric motor, of a hollow cast iron member connected in series relation with said motor and having a section proportionate to the current rating of the motor, and a blower for delivering predetermined volumes of cooling fluid to both said motor and said member to produce equal rates of cooling therein.

6. The combination with an electric motor, of a hollow cast iron member connected in series relation with said motor and having a section proportionate to the current rating of the motor, perforated insulating material surrounding said member, and a blower for forcing predetermined volumes of ventilating air through both said motor and said member.

7. The combination with a translating device, of a hollow cast iron member having a section proportionate to the current rating of said device, and connected in series relation therewith, means for sending a ventilating fluid through said member, and temperature-responsive means inserted in the hollow member.

8. The combination with an electric motor, of a hollow cast iron member connected in series relation with said motor and having a section proportionate to the current rating of the motor, a blower for delivering predetermined volumes of cooling fluid to both said motor and said member to produce equal rates of cooling therein, and temperature-respective means inserted in the hollow member.

9. The combination with a translating device, of a metallic member having thermal characteristics like said device and connected in circuit therewith, a blower for delivering predetermined volumes of cooling fluid to both said motor and said member to produce equal rates of cooling therein, and means responsive to the temperature of said member for varying the speed of said blower.

10. The combination with a translating device, of a hollow cast iron member having a section proportionate to the current rating of said device, and connected in series relation therewith, a blower for forcing predetermined volumes of ventilating air through both said motor and said member, a motor for driving said blower, and means responsive to the temperature of said member for compensatingly varying the speed of said motor.

11. The combination with an electric motor, of a hollow metallic member of relatively low electrical conductively connected in circuit with said motor and adapted to inherently possess the same cooling characteristics as the motor, a blower for forcing predetermined volumes of ventilating air through both said motor and said member, a motor for driving said blower, temperature-indicating means inserted in said hollow member, a switch in the circuit of said blower motor, and means responsive to the action of said temperature-indicating means for cutting said switch into or out of circuit.

12. The combination with a translating device, of a hollow metallic member having thermal characteristics like said device and connected in circuit therewith, and fluid-expelling means for cooling said member.

13. The combination with a translating device, of a hollow cast-iron member having a section proportionate to the current rating of said device, and connected in series relation therewith, and means for delivering a ventilating medium to said member.

14. The combination with a translating device, of a metallic member having a section proportionate to the current rating of said device, means for heating said member similarly to the heating of said device, and means for cooling said member at the same rate as said device.

15. The combination with a translating device, of a metallic member having a section proportionate to the current rating of said device, and means for simultaneously delivering a ventilating fluid to said device and to said member.

16. The combination with an electric motor, of a hollow metallic member having a section proportionate to the current rating of the motor, and a blower for delivering predetermined volumes of cooling fluid to both said motor and said member to produce equal rates of cooling therein.

17. The combination with a translating device of a hollow metallic member having a section proportionate to the current rating of said device, means for sending a ventilating fluid through said member, and temperature-responsive means inserted in the hollow member.

18. The combination with an electric motor, of a hollow metallic member having a section proportionate to the current rating of the motor, a blower for delivering predetermined volumes of cooling fluid to both said motor and said member to produce equal rates of cooling therein, and temperature-responsive means inserted in the hollow member.

In testimony whereof, I have hereunto subscribed my name this 28th day of June, 1919.

NORMAN W. STORER.